Figure 3:
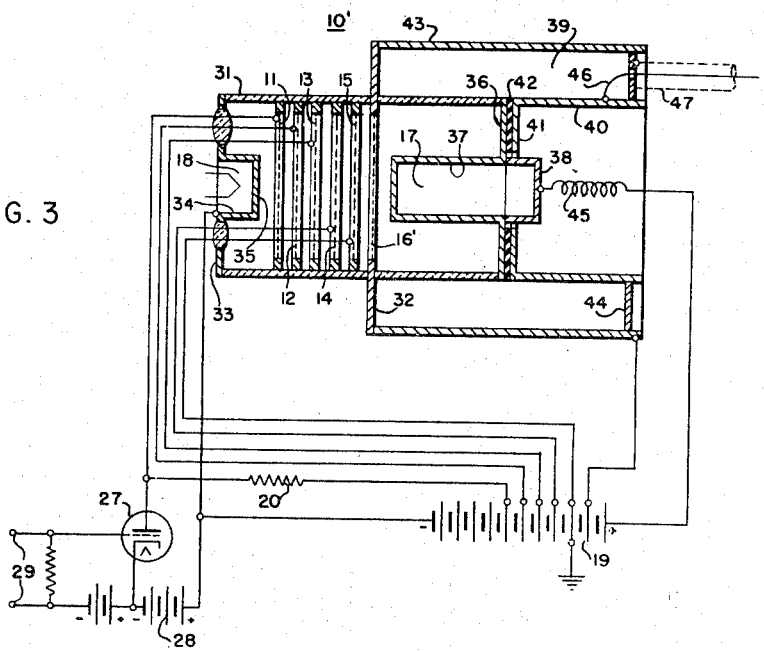

May 20, 1947.  A. V. LOUGHREN  2,420,753
WAVE-SIGNAL TRANSLATING SYSTEM
Filed Nov. 10, 1943  2 Sheets—Sheet 1
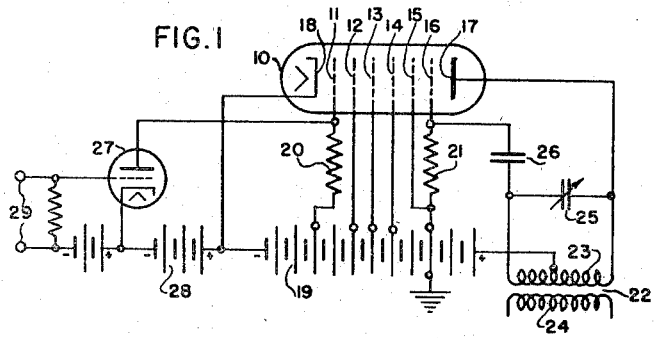
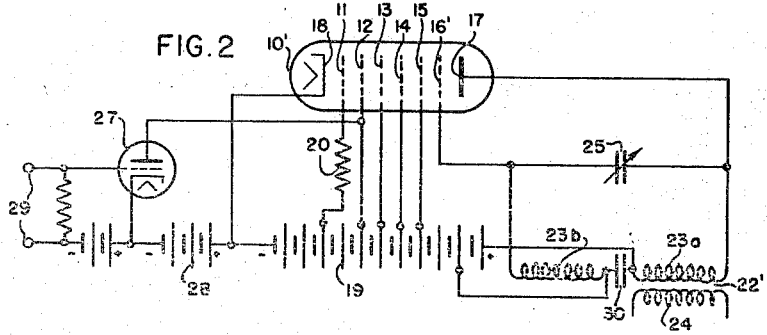
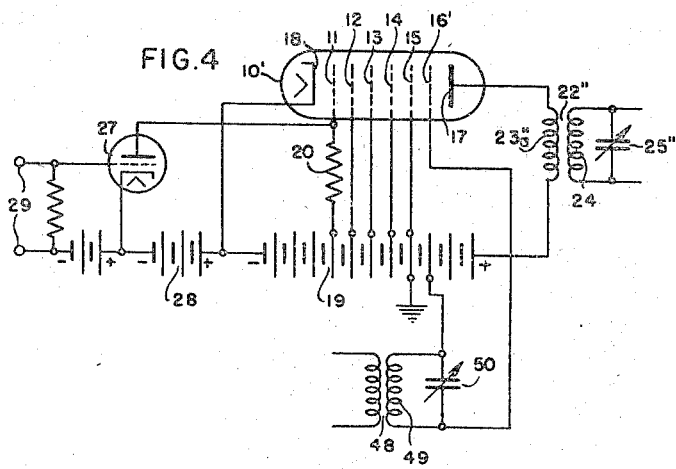
INVENTOR
ARTHUR V. LOUGHREN
BY
ATTORNEY Patented May 20, 1947

2,420,753

UNITED STATES PATENT OFFICE 2,420,753

WAVE-SIGNAL TRANSLATING SYSTEM

Arthur V. Loughren, Great Neck, N. Y., assignor, by mesne assignments, to Hazeltine Research, Inc., Chicago, Ill., a corporation of Illinois Application November 10, 1943, Serial No. 509,718

17 Claims. (Cl. 250—36)

The present invention relates to wave-signal translating systems and particularly to such systems adapted to provide large values of output power. While the invention is of general application, it is particularly suited for use in so-called "pulse-modulation" systems and especially in systems of this type which require the generation and translation of wave signals having frequencies so high that electron transit-time effects occurring in vacuum tubes thereof tend to become of pronounced importance.

The maximum available power output of wave-signal translating apparatus is determined, among other factors, by the power-handling capabilities of the vacuum-tube repeaters used therein. The maximum power output of any vacuum-tube repeater is limited to that value which does not produce excessive heating of its elements, particularly its anode and grid elements. It is, consequently, the present-day custom of manufacturers to rate a given type of vacuum tube in terms of the maximum power which the tube is capable of continuously and safely delivering. A pulse-modulation type of translating system, however, attains an increase of the effective power output by operating its vacuum tubes for relatively short but repeated intervals with peak-power outputs greatly exceeding their normal continuous-power output capabilities. The temperature of the grid and anode elements of a vacuum tube operated in this manner quickly rises to a high average value but the elements have sufficient thermal inertia that they do not become excessively overheated during the short intervals of transmission. The effective power gain which results from this mode of operation is highly desirable in many applications, for example in pulse-modulation systems where the intensity with which a transmitted signal is received at a given location is of paramount importance.

The maximum values of peak-power output heretofore obtainable in prior-art pulse-modulation systems have been appreciably lower than desired, however, due to the limited electron emission which can be obtained from the thermionic cathode of conventional vacuum tubes. In pulse-modulation systems involving high operating voltages and very large power outputs, only vacuum tubes having thermionic cathodes of pure tungsten are generally satisfactory. Thoriated tungsten cathodes, while extensively used in low-power vacuum tubes, are not practicable for high-power pulse-modulation applications because of the severe electrical conditions under which the cathodes operate, resulting in their disintegration. Pure tungsten, however, is characterized by very low values of electron emission. Thus, pure tungsten at 2200° K emits only thirteen milliamperes per square centimeter of emissive surface. This means that the cathodes of vacuum tubes using this cathode material and designed for any given power output are abnormally large, thus materially increasing the initial cost of the tube, requiring excessive cathode heating with resultant decrease in efficiency, and causing abnormally large inherent capacitances and transit-time effects which may become so large as to render the tube in many cases unsuitable for use at high radio frequencies.

It is an object of the present invention, therefore, to provide a new and improved wave-signal translating system for operation at high peak-power and high frequencies and one which avoids one or more of the limitations and disadvantages of prior systems of this type.

It is an additional object of the invention to provide a wave-signal translating system adapted to provide peak-power outputs higher than have heretofore been readily obtainable in practice.

It is a further object of the invention to provide a wave-signal translating system capable of large power output, either continuous or peak, at frequencies so high that electron transit-time effects within a conventional tube in such a system would tend materially to impair the operation desired of the system.

It is an additional object of the invention to provide a new and improved wave-signal translating system particularly suited for use with pulse modulation and one which, when so used, is adapted to provide large peak-power outputs with high power efficiency.

In accordance with the invention, a high-frequency wave-signal translating system comprises an electron multiplier including in closely spaced alignment in the order named an electron-permeable electron-multiplier electrode, an electron-permeable control electrode and a collector anode. The electrodes are arranged transverse the path of electron flow therebetween and the spacing between the electron multiplier and control electrodes is small to provide an electron transit time small with relation to the period of the translated wave signal. The system includes means for supplying electrons to the electron-multiplier electrode, means for biasing the multiplier electrode and the anode to progressively higher positive potentials with relation to the supply means, a wave-signal input circuit coupled to the control and multiplier electrodes and a wave-signal output circuit coupled to the anode and one of the first-mentioned electrodes.

In accordance with a particular form of the invention, a high-frequency wave-signal translating system comprises an electron multiplier including in closely spaced alignment an electron-emissive electrode, a collector anode, and a plurality of electron-permeable electron-multiplier electrodes between the first-mentioned electrode and the anode. The system includes means for biasing the multiplier electrodes and the anode to progressively higher positive potentials with relation to the electron-emissive electrode, a wave-signal input circuit coupled to the two of the multiplier electrodes which are positioned nearest the anode, the electrodes being arranged transverse the path of electron flow therebetween and the spacing between the two multiplier electrodes being small to provide an electron transit time small with relation to the period of the translated wave signal, and a wave-signal output circuit coupled to the anode and one of the aforesaid two electrodes.

For a better understanding of the present invention, together with other and further objects thereof, reference is had to the following description taken in connection with the accompanying drawings and its scope will be pointed out in the appended claims.

Figure 5:
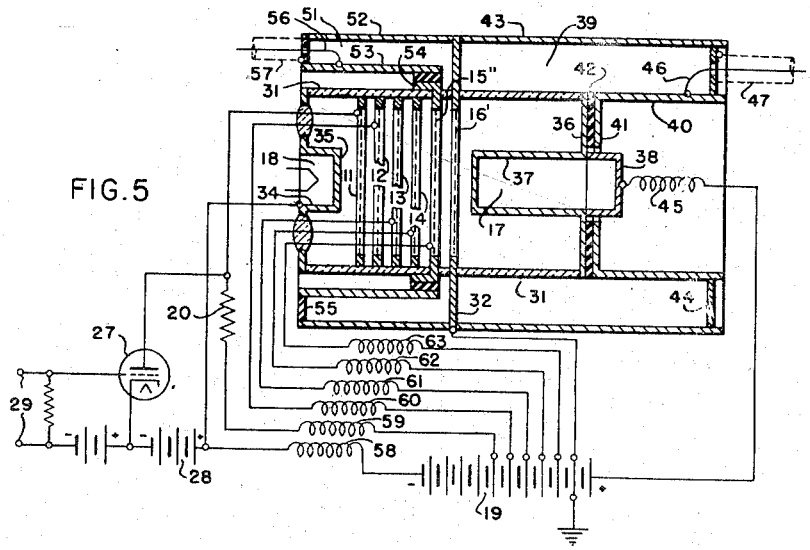

Referring now to the drawing, Fig. 1 is a circuit diagram of a wave-signal translating system of the oscillator type; Fig. 2 represents a modified form of the invention which comprises an oscillator essentially similar to that of Fig. 1; Fig. 3 illustrates a vacuum-tube construction particularly suitable for use in the Fig. 2 modification of the invention when the generation of ultra-high-frequency oscillations is required; Fig. 4 represents another form of the invention wherein the latter is embodied in a wave-signal amplifier; and Fig. 5 illustrates a vacuum-tube construction, essentially similar to that of Fig. 3, which is particularly suitable for use in the Fig. 4 system when the amplification of ultra-high frequency wave signals is desired.

Referring now more particularly to Fig. 1 of the drawing, there is represented a circuit diagram of a wave-signal translating system of the oscillator type embodying the present invention. The system comprises an electron-multiplier tube 10 which includes, in the order named, a plurality of electron-multiplier electrodes 11–15, inclusive, a control electrode 16 and a collector anode 17. The electron-multiplier tube also includes means for supplying electrons to the electron-multiplier electrodes, this means comprising an electron-emissive cathode 18. The electron-multiplier electrodes 11–15, inclusive, may comprise multiplier grids arranged transverse the path of electron flow between the anode 17 and cathode 18 as indicated, or they may comprise any of numerous other well-known forms of secondary-electron emissive electrodes, for example, secondary-electron emissive plates arranged to lie along the electron path.

The translating system includes means for biasing the multiplier electrodes 11–15, inclusive, and the anode 17 to progressively higher positive potentials with relation to the electron supply means or cathode 18 and for biasing the control electrode 16 to a potential intermediate that of the anode and cathode. This means comprises a source of unidirectional potentials, for example a battery 19, having a negative terminal connected to the cathode 18 and having positive terminals individually connected in the order of increasing potential to the electron-multiplier electrodes 11–15, inclusive, and the anode 17, the terminal connected to multiplier electrode 15 preferably being grounded. The first electron-multiplier electrode 11 is connected to the battery 19 through a control-bias resistor 20 while the control electrode 16 is connected to the battery 19 through a grid-leak resistor 21.

Wave-signal input and output circuits for the electron-multiplier tube 10 are provided by a transformer 22 having a center-tapped primary winding 23 and a secondary winding 24. The primary winding 23 is tuned to a desired wave-signal frequency by a condenser 25. One of its end terminals is connected to the anode 17 and the other is coupled to control electrode 16 through a coupling condenser 26. The center tap of the winding 23 is connected to the most positive terminal of the battery 19, and thus, for radio-frequency components, effectively to multiplier electrode 15. One-half of the winding 23 is thus coupled to the control electrode 16 and multiplier electrode 15 and comprises a wave-signal input circuit, the other half of the winding being coupled to the anode 17 and to the multiplier electrode 15 to comprise a wave-signal output circuit, the input and output circuits being inductively coupled.

The translating system also includes means for modulating the electron flow to the anode 17 in accordance with a modulation signal. More specifically this comprises means for applying to one of the tube electrodes, for example the multiplier electrode 11, a modulation signal of periodic-pulse wave form to reduce the anode current of tube 10 during a given interval of each cycle of the modulation signal. This means comprises a vacuum-tube repeater 27 having output electrodes coupled to an output circuit which includes the control-bias resistor 20, a portion of the battery 19, and a battery 28. The input electrodes of the repeater 27 are coupled to a pair of input-circuit terminals 29 to which is applied the modulation signal of periodic-pulse wave form. The polarity of this signal is such that each pulse thereof biases the repeater 27 to anode-current cutoff.

Consider now the operation of the wave-signal translating system just described and assume that a pulse of the modulation signal is initially applied to the input circuit terminals 29 to bias the repeater 27 to anode-current cutoff. Only the current of the electron-multiplier electrode 11 passes through the bias-control resistor 20 under the assumed conditions, but this current is insufficient to produce any large potential drop across the resistor so that the multiplier electrode 11 has applied thereto a normal positive operating potential. Electrons emitted by the cathode 18 of tube 10 flow to the electron-multiplier electrode 11 to release from the latter secondary electrons. These in turn flow to the electron multiplier 12 to release other secondary electrons, this process being repeated at the electron-multiplier electrodes 13, 14, and 15 in a well-known manner. The electrons which leave the last electron-multiplier electrode 15 and flow toward the control electrode 16 are greatly multiplied in number as compared with those emitted by the cathode 18 and thus represent a space current of considerably larger magnitude than that of the latter element.

The last electron-multiplier electrode 15, the control electrode 16 and anode 17 are included with the transformer 22 in a conventional Hartley oscillator circuit tuned by the condenser 25 to a desired wave-signal frequency. The oscillations applied to the control electrode 16 are peak rectified by the latter to develop across the resistor 21 a self-bias potential negative with respect to the multiplier electrode 15. In this oscillatory state of the translating system, the last electron-multiplier electrode 15 is effectively the cathode of the oscillator portion of tube 10 rather than the thermionic cathode 18. The magnitude of the electron stream flowing from the last electron multiplier 15 is many times larger than could be obtained from the cathode 18 alone and, hence, the translating system of the preesnt arrangement is capable of delivering large power output through the secondary winding 24 of the transformer 22 to succeeding apparatus not shown. The relatively close spacing of the multiplier electrode 15, the control electrode 16 and anode 17 minimizes the effect of electron transit time and consequently permits the generation of very high frequency oscillations.

As soon as the pulse of the modulation signal is removed from the input terminals 29, the vacuum-tube repeater 27 becomes conductive to develop across the resistor 20 a large potential drop of sufficient magnitude that the first electron-multiplier electrode 11 has applied thereto a large negative bias and is effective at this time to bias tube 10 beyond anode-current cutoff. No electrons are supplied under this condition to any of the electron-multiplier electrodes 11-15, inclusive, with the result that the oscillatory state of the translating system ceases until such time as another pulse is applied to the input terminals 29.

Due to the large current flow through tube 10 during its oscillatory condition, the several electron-multiplier electrodes and the anode thereof would heat quite rapidly if the oscillatory condition were allowed to continue for an appreciable fraction of a second. Consequently the duration of each of the pulses applied to the input terminals 29 is preferably quite short, as of the order of ten to twenty microseconds, and the period of recurrence thereof is much longer to limit the total heat energy supplied to the electrodes to an average value insufficient to cause excessive heating of the electrodes. The system in its oscillatory state is thus capable of delivering peak-power outputs greatly exceeding the continuous-power output rating of the electron-multiplier tube 10. It is to be noted also, that the translating system requires minimum energizing power since current flows from the battery 19 to the electrodes of tube 10 only during the relatively short oscillatory periods, each for example of about 10 microseconds duration, but no current flows during the long inactive periods, which may be of the order of 100 microseconds or more. Consequently, the system operates with high power efficiency.

Fig. 2 is a circuit diagram representing a modified form of the invention essentially similar to that of Fig. 1, similar elements being designated by similar reference numerals and analogous elements by similar reference numerals primed, except that the control electrode 16' of the Fig. 2 arrangement is also a secondary-electron emissive electrode. This requires that the control electrode be operated at a potential positive with respect to the preceding electron-multiplier electrode 15. Consequently, the transformer 22' is provided with a split secondary winding having the sections 23a, 23b thereof, serially coupled by a blocking condenser 30. The junction of the winding 23b and condenser 30 is connected to a point on the battery 19 intermediate the points of connection thereto of the multiplier electrode 15 and the anode 17. Since the control electrode 16' also serves as a multiplier electrode in the present embodiment, it has a negative conductance component in its input admittance. It consequently acts as an additional source of energy for the tuned circuit 23a, 23b, 25 instead of representing a load to that circuit as in the Fig. 1 arrangement. The operation of this modified form of the invention is otherwise essentially similar to that of Fig. 1 and will not be repeated.

Fig. 3 illustrates a suitable tube construction and circuit arrangement which may be employed in a wave-signal translating system, essentially similar to that of Fig. 2, adapted to generate a wave signal having a frequency of the order of 100 to 3000 megacycles or more. Elements of the Fig. 3 tube structure and circuit arrangement corresponding to similar elements of Fig. 2 are designated by similar reference numerals. The Fig. 3 electron multiplier tube 10' includes an evacuated envelope 31 which encloses the cathode 18, electron-multiplier electrodes 11-15, inclusive, and the anode 17. The control electrode 16' in this case comprises a conductive diaphragm 32 which has an electron permeable central portion and which extends through and across the envelope 31 to divide the latter into sections. The cathode 18 is secured to a conductive disc 33 sealed to and closing one end of the envelope 31 and having apertures through which are sealed the lead-conductors to the multiplier electrodes 11-15, inclusive. A re-entrant portion 34 of the cathode encloses the usual cathode heater, as indicated, and is provided on its end with a cathode-emissive surface 35. The anode 17 similarly is secured to a conductive disc 36, sealed to and closing the other end of the envelope 31, and has a tubular anode portion 37. A cup-shaped cap 38 is secured in opposing relation to the anode portion 37 of the anode to provide an anode terminal of low impedance.

The oscillatory circuit of the present translating system comprises a resonant concentric transmission line 39 having an inner conductor 40 capacitively coupled at one end, as by a turned-in flange 41 and a sheet of insulation 42, to the anode 17 and having an outer conductor 43, electrically connected at the one end to the control-electrode diaphragm 32. Where it is desired that the transmission line 39 operate with an electrical length of one-quarter wave length or odd multiple thereof, its remote end is short-circuited by an annular disc 44 which may be axially adjustable between the inner and outer conductors 40, 43 to adjust the electrical length of this line to the proper value. If, on the other hand, the transmission line 39 is to be operated with an electrical length of one-half wave length or multiple thereof, the disc 44 is not used and the remote end of the transmission line remains open-circuited. A point on the transmission line, for example any point on the external surface of the outer conductor 43 or on the internal surface of the conductor 40 in the region of the shorting disc 44, is connected to the battery 19 to apply to the control electrode 16' an operating potential intermediate those of the multiplier electrode 15 and anode 17. Energizing potential for the anode 17 is supplied from the most positive terminal of the battery 19 through a radio-frequency choke 45. Output power from the Fig. 3 translating system is applied to utilizing apparatus, not shown, through a pick-up loop 46 coupled to a coaxial transmission line 47.

The operation of the Fig. 3 translating system is essentially similar to that of Fig. 2, the distributed inductance and capacitance of the transmission line 39 causing it to have a predetermined resonant frequency varying with its electrical length. The potential applied by the transmission line to the control electrode 16' is 180° out of phase with that developed at the anode 17 so that the system is adapted to generate sustained oscillations during each of the intervals when electrons are supplied to the anode. The pick-up loop 46 is positioned within the transmission line 39 in the region of maximum magnetic field and maximum energy is thus supplied to succeeding utilizing apparatus, not shown. Adjustment of the shorting disc 44 changes the electrical length of the transmission line 39 thereby to change the operating frequency of the system.

The Fig. 4 modification of the invention is one wherein the translating system is utilized as a wave-signal repeater. This arrangement is essentially similar to that of Fig. 2, similar circuit elements being designated by similar reference numerals and analogous circuit elements by similar reference numerals double primed, except that the input circuit of the electron-multiplier tube 10' is not coupled to the output circuit thereof but instead comprises an input transformer 48 having a secondary winding 49 tuned by a condenser 50 and coupled between the multiplier electrode 15 and control electrode 16'.

The operation of the Fig. 4 modification is essentially similar to that of Fig. 2, except insofar as the generation of sustained oscillations is concerned, in that wave-signal energy applied to the input circuit transformer 48 is amplified by the electron-multiplier tube 10' during intervals of anode-current flow and applied through the output circuit transformer 22" to succeeding utilizing apparatus, not shown. In this operation the multiplier electrode 15 is effectively the cathode of the amplifier section of the tube 10' as in the Figs. 1 and 2 arrangements, whereby the electron multiplier 10" operates essentially as a triode type of tube having a cathode 15, a control electrode 16', and an anode 17. The system is adapted to operate with peak-power outputs greatly exceeding the average-power capabilities of the tube 10' by virtue of the control exercised thereover by the control repeater tube 27 which has the same function and mode of operation as previously explained in connection with the Fig. 1 arrangement. The close spacings of the multiplier electrode 15, the control electrode 16' and the anode 17 of the electron multiplier 10' minimize the effect of electron transit time within tube 10' thus enabling the translation of wave signals of very high frequency.

Fig. 5 represents a cross-sectional view of an electron-multiplier tube suitable for use in the Fig. 4 modification of the invention where it is desired that the system translate ultra-high-frequency wave signals of the order of 100 to 3000 megacycles or more. The construction of the electron-multiplier tube is essentially similar to that of Fig. 3, similar elements being designated by similar reference numerals and analogous elements by similar reference numerals double primed, except that the last electron-multiplier 15" extends through the tube envelope 31 and has a turned-over flange 54 external to the envelope and lying along the outer surface thereof. An input circuit for the system is provided by a transmission line 51. One end of the outer conductor 52 of the latter is connected to the diaphragm 32 of the control electrode 16' while the corresponding end of its inner conductor 53 is capacitively coupled to the turned-over flange portion 54 of the multiplier electrode 15". The remote end of the transmission line 51 is short-circuited by an annular disc 55 which has the same function and purpose as the disc 44 of the output circuit transmission line 39. Wave-signal energy is applied to the input transmission line 51 by means of an input loop 56 located within the latter and coupled to the end of an input coaxial line 57. The circuit arrangement employed in Fig. 5 is the same as that of Fig. 4 except that the cathode 18 and multiplier electrodes 11'–15", inclusive, may, if desired be maintained above ground potential for radio-frequency currents by the provision of respective chokes 58—63, inclusive, in the energizing circuits of these several tube elements. The operation of the present system is the same as that of Fig. 4 and will not be repeated.

While the translating system of the invention has been described in connection with an arrangement having high overall power efficiency, effected by the inclusion of the control-bias resistor 20 in the energizing circuit of the first electron-multiplier electrode 11, it will be apparent that the system may alternatively be operated with decreased power efficiency, if desired for a particular application, by including the control resistor 20 in the energizing circuit of any of the electrodes 12 to 16, inclusive.

From the above description of the invention, it will be apparent that a translating system embodying the invention is adapted to deliver peak-power outputs during pulse-modulation operation greatly exceeding that which has heretofore been readily obtainable in practice. At the same time, the system is particularly well suited to translate very high-frequency wave signals having frequencies of the order of 100 to 3000 megacycles or higher.

While there have been described what are at present considered to be the preferred embodiments of this invention, it will be obvious to those skilled in the art that various changes and modifications may be made therein without departing from the invention, and it is therefore, aimed in the appended claims to cover all such changes and modifications as fall within the true spirit and scope of the invention.

What is claimed is:

1. A high-frequency wave-signal translating system comprising, an electron multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron-multiplier electrode, means for biasing said multiplier electrode and said anode to progressively higher positive potentials with relation to said supply means, a wave-signal input circuit coupled to said control and multiplier electrodes, and a wave-signal output circuit coupled to said anode and one of said electrodes.

2. A high-frequency wave-signal translating system comprising, an electron multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron multiplier electrode, means for biasing said multiplier electrode and said anode to progressively higher positive potentials with relation to said supply means, a wave-signal input circuit coupled to said control and multiplier electrodes, and a wave-signal output circuit coupled to said anode and said multiplier electrode.

3. A high-frequency wave-signal translating system comprising, an electron multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron-multiplier electrode, means for biasing said multiplier electrode and said anode to progressively higher positive potentials with relation to said supply means and for biasing said control electrode to a potential intermediate that of said anode and said supply means, a wave-signal input circuit coupled to said control and multiplier electrodes, and a wave-signal output circuit coupled to said anode and one of said electrodes.

4. A high-frequency wave-signal translating system comprising, an electron multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron-multiplier electrode, means for biasing said multiplier electrode and said anode to progressively higher positive potentials with relation to said supply means, a wave-signal input circuit coupled to said control and multiplier electrodes, a wave-signal output circuit coupled to said anode and one of said electrodes, and means responsive to a wave signal applied to said input circuit for providing an operating bias for said control electrode negative with relation to said multiplier electrode.

5. A high-frequency wave-signal translating system comprising, an electron multiplier including in closely spaced alignment an electron-emissive electrode, a collector anode, and a plurality of electron-permeable electron-multiplier electrodes between said first-named electrode and said anode, means for biasing said multiplier electrodes and said anode to progressively higher positive potentials with relation to said electron-emissive electrode, a wave-signal input circuit coupled to the two of said multiplier electrodes which are positioned nearest said anode, said electrodes being arranged transverse the path of electron flow therebetween and the spacing between said two multiplier electrodes being small to provide an electron transit time small with relation to the period of the translated wave signal, and a wave-signal output circuit coupled to said anode and one of said two electrodes.

6. A high-frequency wave-signal translating system comprising, an electron multiplier including in closely spaced alignment an electron-emissive electrode, a collector anode, and a plurality of electron-permeable electron-multiplier electrodes between said first-named electrode and said anode, means for biasing said multiplier electrodes and said anode to progressively higher positive potentials with relation to said electron-emissive electrode, a wave-signal input circuit coupled to the two of said multiplier electrodes which are positioned nearest said anode, said electrodes being arranged transverse the path of electron flow therebetween and the spacing between said two multiplier electrodes being small to provide an electron transit time small with relation to the period of the translated wave signal, and a wave-signal output circuit coupled to said anode and the one of said two electrodes which is remote from said anode.

7. A high-frequency wave-signal translating system comprising, an electron-multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron-multiplier electrode, means for biasing said multiplier electrode and said anode to progressively higher positive potentials with relation to said supply means, a wave-signal input circuit coupled to said control and multiplier electrodes, a wave-signal output circuit coupled to said anode and one of said electrodes, and means for modulating the electron flow to said anode in accordance with a modulation signal.

8. A high-frequency wave-signal translating system comprising, an electron-multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron-multiplier electrode, means for biasing said multiplier electrode and said anode to progressively higher positive potentials with relation to said supply means, a wave-signal input circuit coupled to said control and multiplier electrodes, a wave-signal output circuit coupled to said anode and one of said electrodes, and means for controlling the electron flow to said anode in accordance with a modulation signal of periodic pulse wave form to reduce the anode current of said electron multiplier during a given interval of each cycle of said modulation signal.

9. A high-frequency wave-signal translating system comprising, an electron-multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron-multiplier electrode, means for biasing said multiplier electrode and said anode to progressively higher positive potentials with relation to said supply means, a wave-signal input circuit coupled to said control and multiplier electrodes, a wave-signal output circuit coupled to said anode and one of said electrodes, and means for controlling the electron flow to said anode in accordance with a modulation signal of periodic-pulse wave form to reduce the anode current of said electron multiplier substantially to zero in the absence of a pulse of said modulation signal.

10. A high-frequency wave-signal translating system comprising, an electron multiplier including in closely spaced alignment in the order named a plurality of electron-permeable electron-multiplier electrodes, an electron-permeable control electrode and a collector anode, means for supplying electrons to the one of said electron-multiplier electrodes remote from said anode, means for biasing said multiplier electrodes and said anode to progressively higher positive potentials with relation to said supply means, a wave-signal input circuit coupled to said control electrode and to the one of said multiplier electrodes adjacent thereto, said electrodes being arranged transverse the path of electron flow therebetween and the spacing between said control electrode and said one adjacent multiplier electrode being small to provide an electron transit time small with relation to the period of the translated wave signal, a wave-signal output circuit coupled to said anode and one of said last-named electrodes, and means for applying to one of said electrodes a modulation signal to control in accordance therewith the electron flow to said anode.

11. A high-frequency wave-signal translating system comprising, an electron multiplier including in closely spaced alignment in the order named a plurality of electron-permeable electron-multiplier electrodes, an electron-permeable control electrode and a collector anode, means for supplying electrons to the one of said electron-multiplier electrodes remote from said anode, means for biasing said multiplier electrodes and said anode to progressively higher positive potentials with relation to said supply means, a wave-signal input circuit coupled to said control electrode and to the one of said multiplier electrodes adjacent thereto, said electrodes being arranged transverse the path of electron flow therebetween and the spacing between said control electrode and said one adjacent multiplier electrode being small to provide an electron transit time small with relation to the period of the translated wave signal, a wave-signal output circuit coupled to said anode and one of said last-named electrodes, and means for applying to one of said electrodes a potential of periodic-pulse wave form to reduce the electron flow to said anode in the absence of a pulse of said potential.

12. A high-frequency wave-signal translating system comprising, an electron multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron-multiplier electrode, means for biasing said multiplier electrode and said anode to progressively higher positive potentials with relation to said supply means, a wave-signal input circuit coupled to said control and multiplier electrodes, and a wave-signal output circuit coupled to said anode and said multiplier electrode and including means for coupling energy from said output circuit to said input circuit to adapt said translating system to generate sustained oscillations.

13. A high-frequency wave-signal translating system comprising, an electron multiplier including in closely spaced alignment in the order named an electron-permeable electron-multiplier electrode, an electron-permeable control electrode and a collector anode, said electrodes being arranged transverse the path of electron flow therebetween and the spacing between said electron multiplier and control electrodes being small to provide an electron transit time small with relation to the period of the translated wave signal, means for supplying electrons to said electron-multiplier electrode, means for biasing said multiplier electrode and said anode to progressively higher positive potentials with relation to said supply means, and a resonant circuit having end terminals individually coupled to said anode and said control electrode and having an intermediate terminal coupled to said multiplier electrode to provide a translating system adapted to generate sustained oscillations.

14. A high-frequency wave-signal translating system comprising, an electron-multiplier tube having an envelope and including in the order named a cathode, an electron-multiplier electrode, a control electrode and an anode, said control electrode comprising a conductive diaphragm extending across said envelope to divide said envelope into sections, means for biasing said multiplier electrode and said anode to progressively higher positive potentials with relation to said cathode, and a resonant concentric transmission line having the conductors thereof individually coupled at one end to said diaphragm and said anode and having a point spaced from said one end coupled to said multiplier electrode, thereby to provide coupled input and output circuits for said translating system.

15. A high-frequency wave-signal translating system comprising an electron-multiplier tube having an envelope and including in the order named a cathode, an electron-multiplier electrode, a control electrode and an anode, said control electrode comprising a conductive diaphragm extending across said envelope to divide said envelope into sections, means for biasing said multiplier electrode and said anode to progressively higher positive potentials with relation to said cathode, and a resonant concentric transmission line having the outer conductor thereof coupled at one end to said diaphragm, the inner conductor thereof coupled at said one end to said anode, and having a point spaced from said one end coupled to said multiplier electrode thereby to provide respective input and output circuits for said translating system.

16. A high-frequency wave-signal translating system comprising, an electron-multiplier tube having an envelope and including in the order named a cathode, an electron-multiplier electrode, a control electrode and an anode, said electron multiplier and control electrode each comprising a conductive diaphragm extending across said envelope to divide said envelope into sections, means for biasing said multiplier electrode and said anode to progressively higher positive potentials with relation to said cathode, a wave-signal input circuit including a resonant concentric transmission line having the conductors thereof individually coupled at one end to said multiplier-electrode and control-electrode diaphragms, and a wave-signal output circuit including a resonant concentric transmission line having the conductors thereof individually coupled at one end to said anode and said control-electrode diaphragm.

17. A high-frequency wave-signal translating system comprising, an electron-multiplier tube having an envelope and including in the order named a cathode, an electron-multiplier electrode, a control electrode and an anode, said electron multiplier and control electrode each comprising a conductive diaphragm extending across said envelope to divide said envelope into sections, means for biasing said multiplier electrode and said anode to progressively higher positive potentials with relation to said cathode, a wave-signal input circuit including a resonant concentric transmission line having the inner conductor thereof coupled at one end to said multiplier-electrode diaphragm and the outer conductor thereof coupled at said one end to said control-electrode diaphragm, and a wave-signal output circuit including a resonant concentric transmission line having the inner conductor thereof coupled at one end to said anode and the outer conductor thereof coupled at said one end to said control-electrode diaphragm.

ARTHUR V. LOUGHREN.

REFERENCES CITED

The following references are of record in the file of this patent:

UNITED STATES PATENTS

| Number | Name | Date |
| --- | --- | --- |
| 2,245,119 | Walton | June 10, 1941 |
| 2,073,599 | Malter | Mar. 9, 1937 |
| 2,220,452 | Jarvis | Nov. 5, 1940 |
| 2,306,457 | Mayne | Dec. 29, 1942 |